United States Patent [19]

Gupta et al.

[11] 3,996,223
[45] Dec. 7, 1976

[54] PROCESS FOR THE PRODUCTION OF POLYISOCYANATES OF ISOCYANURATE STRUCTURE

[75] Inventors: Pramod Gupta, Bedburg; Roland Nast, Dormagen; Erwin Windemuth, Bad Sooden-Allendorf, all of Germany

[73] Assignee: Bayer Aktiengesellschaft, Leverkusen, Germany

[22] Filed: Oct. 28, 1975

[21] Appl. No.: 626,404

[30] Foreign Application Priority Data

Nov. 6, 1974 Germany .......................... 2452532

[52] U.S. Cl. .................... 260/248 NS; 260/2.5 AT; 260/2.5 AW; 260/77.5 AT; 260/77.5 NC
[51] Int. Cl.² ....................................... C07D 251/04
[58] Field of Search .............................. 260/248 NS

[56] References Cited

UNITED STATES PATENTS

| 2,954,365 | 9/1960 | Windemuth et al. .......... 260/248 X |
| 3,259,625 | 7/1966 | Ugi et al. ............................ 260/248 |

*Primary Examiner*—Lewis Gotts
*Assistant Examiner*—Dolph H. Torrence
*Attorney, Agent, or Firm*—Joseph C. Gil; Gene Harsh

[57] ABSTRACT

Soluble polyisocyanates of isocyanurate structure are produced by heating polyisocyanates in the presence of Mannich bases and carbamic acid esters of isocyanates and secondary alcohols. When such a process is used, the polymerization reactions begin without incubation times and the catalysts need not be inactivated by introducing additives because they deactivate themselves at high temperatures.

11 Claims, 1 Drawing Figure

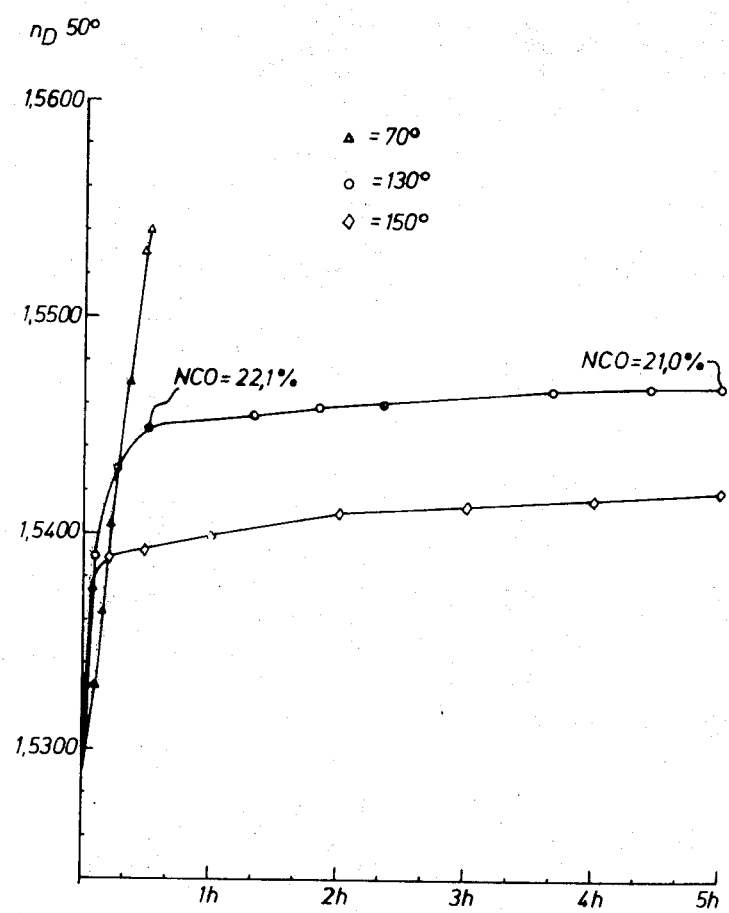

PROCESS FOR THE PRODUCTION OF POLYISOCYANATES OF ISOCYANURATE STRUCTURE

BACKGROUND OF THE INVENTION

Numerous processes for the production of isocyanurate polymerization products are known. These are predominantly the polymerization products of polyisocyanates in basic catalysts. Insoluble end products with a plastic-like character are obtained in these processes when polymerization is carried through to completion, and are accompanied by the formation of a plurality of isocyanurate rings. Alternatively, soluble NCO-group-containing polymerization products of isocyanurate structure (which are of higher functionality by comparison with the starting isocyanates) are obtained when polymerization is prematurely terminated, for example, by neutralizing the catalysts. These relatively high molecular weight, soluble polyisocyanates of isocyanurate structure are widely used in polyurethane chemistry, for example, as crosslinkers in the production of lacquers, or in the production of foams as recommended in German Patents Nos. 1,022,789 and 1,027,394. Over recent years, foam applications have acquired considerable significance because it is now known that highly elastic, flameproof polyether foams may be obtained with such polyisocyanates of isocyanurate structure and relatively high functionality, provided that production of the foams is carried out in the absence of conventional foam stabilizers of the organosiloxane-hydroxy alkylene block copolymer type (German Auslegeschrift No. 1,929,034). In view of the considerable significance of this discovery, it may readily be appreciated why increased interest is also being shown in processes for the production of polyisocyanates of isocyanurate structure. Safe control of the exothermic polymerization reaction on an industrial scale is a particularly important factor.

One feature of conventional processes for the production of polyisocyanates of isocyanurate structure is the need for the premature termination of the polymerization of the starting polyisocyanates, catalyzed by basic catalysts. Termination is generally obtained by inactivating the catalysts by the addition of acid-reacting substances or alkylating agents. Unless polymerization is terminated, the polymerization reaction ultimately results in the formation of insoluble and, hence, unusable end products. In many cases, the uncontrolled, exothermic polymerization reactions also result in dangerous, uncontrollable increases in temperature which may ultimately initiate secondary reactions, such as carbodiimide formation followed by urethane imine formation, so that totally unusable end products are obtained.

Another disadvantage of the production of polymerization products by trimerizing isocyanates are the incubation times occasionally observed before the onset of the trimerization reactions. This is the case, for example, with the process described in German Patent No. 1,106,767. If, in the process described therein, 0.66 part of triethylene diamine and 1.34 parts of propylene oxide as co-catalyst are added to a solution of 100 parts of phenyl isocyanate in 100 parts of acetone, an exothermic trimerization reaction is only observed after a prolonged incubation time of approximately 70 minutes at 30° C. In practice, any polymerization reaction which begins immediately after the addition of catalyst and which progresses steadily is preferred to a polymerization reaction involving an incubation period, followed by a highly exothermic reaction, because of the greater operational reliability.

One very versatile process for the production of polyisocyanates of isocyanurate structure is described in German Patent No. 1,013,869. In this process, monomeric organic monoisocyanates and/or polyisocyanates are heated in the presence of small quantities of tertiary amines and carbamic acid esters mono-substituted on the nitrogen atom. However, the need for polymerization to be prematurely terminated by the addition of acid-reacting substances is still essential in this process, since tertiary amines such as hexahydrodimethyl aniline or per-methylated diethylene triamine are used.

DESCRIPTION OF THE INVENTION

It has now surprisingly been found that soluble NCO-group-containing polyisocyanates of isocyanurate structure may be safely produced without any need for the exothermic polymerization reaction to be interrupted by the introduction of additives when polyisocyanates are heated both in the presence of Mannich bases and in the presence of carbamic acid esters of isocyanates and secondary alcohols mono-substituted on the nitrogen atom. It has surprisingly been found that, when this procedure is adopted, the polymerization reactions begin immediately without any incubation times, the catalysts need not be inactivated by the introduction of additives, and the reactions are easier to control, even at high initial reaction temperatures. This type of behavior from a combination of co-catalysts is, of course, highly desirable because it provides for the safe production of soluble NCO-group-containing polyisocyanates of isocyanurate structure. This is true even in relatively large reaction mixtures, where dissipation of the heat generated during the exothermic reaction gives rise to difficulties which often cannot be overcome with other catalysts or combinations of catalysts.

Accordingly, the present invention relates to a process for the production of organic polyisocyanates in the presence of catalysts which accelerate the trimerization of isocyanate groups to form isocyanurates. The polymerization reaction is terminated by thermal deactivation of the catalyst when the NCO-content of the reacting polyisocyanate mixture corresponds to about 50 to 90% of the isocyanate content of the polyisocyanate mixture used as the beginning of the polymerization reaction. Since it is the object of the present invention to provide a process for the preparation of polyisocyanate compositions containing isocyanurate groups the process is preferably terminated with 10 to 40% of the initial isocyanate groups have reacted to form isocyanurates The process is distinguished by the fact that:

a. a mixture of Mannich bases and carbamic acid esters of isocyanates and alcohols with secondary hydroxyl groups is used as the catalyst; and b. the catalyst is thermally deactivated by heating the reaction mixture to temperatures in the range of from about 90° to about 150° C.

Starting materials suitable for use in the process of the invention include aliphatic and, preferably, aromatic polyvalent isocyanates. Suitable materials also include alkylene diisocyanates such as tetra-, penta- and hexamethylene diisocyanate; 1-isocyanato-3,3,5trimethyl-5-isocyanatomethyl cyclohexane; the isomeric xylylene diisocyanates; arylene diisocyanates and their alkylation products, such as the phenylene diisocyanates, naphthylene diisocyanates, diphenyl methane diisocyanates, tolylene diisocyanates and triphenyl methane triisocyanates. It is also possible to use ester isocyanates of acids of phosphorus, such as p-isocyanatophenyl phosphoric acid triester, p-isocyanatophenyl thiophosphoric acid triester, styryl phosphonic acid bis-(3-isocyanato-4-methyl phenyl ester) or isocyanates of the type described in German Patent No. 1,066,582 from monomeric or polymeric silicic acid esters containing primary amino groups and silanol ethers.

Other suitable starting materials, preferably used in combination with liquid monomeric polyisocyanates, are isocyanates containing urethane groups. Such materials may be obtained from the above-mentioned polyisocyanates, and monovalent and/or higher valent aliphatic or aromatic compounds containing hydroxyl groups with an NCO:OH ratio of greater than 1. Biuret polyisocyanates may also be used. These biuret polyisocyanates may be obtained, for example, in accordance with German Patents 1,101,394; 1,174,759 and 1,227,004 from monomeric polyisocyanates and water, primary amines or substituted ureas. Finally, when the reaction is carried out with ammonia, the carbamyl biuret polyisocyanates obtainable in accordance with German Patent 1,227,003 may be used.

Mono-functional isocyanates, such as propyl isocyanate, phenyl isocyanate and p-chlorophenyl isocyanate, may also be used, although they should not make up any more than about 20% [based on the isocyanate content], of the total isocyanate material used.

The isocyanates disclosed herein may be used either individually or in admixture with one another. The preferred polyisocyanates include tolylene-2,4- and -2,6-diisocyanates; diphenyl methane-4,4'-diisocyanate; polyisocyanates obtained by phosgenating aniline-formaldehyde condensation products; and mixtures of the above-mentioned tolylene diisocyanates with these polyisocyanates of the diphenyl methane series.

The process according to the invention is carried out in the presence of combinations of Mannich bases and carbamic acid esters of isocyanates and secondary alcohols as catalysts.

The Mannich bases are generally used in quantities of from 50 to 3000 ppm and preferably in quantities of from 200 to 2000 ppm, based on the total quantity of starting polyisocyanate. ("starting polyisocyanate" means the polyisocyanate which is available for the trimerization reaction. NCO-groups which may be used in the preparation of the cocatalyst in situ are not included in the "starting polyisocyanate." "ppm" whenever used in this specification means "parts per million by weight.") The Mannich bases may be of any type, although it is preferred to use known Mannich bases of phenols of the type obtained in known manner by Mannich's reaction of phenols with aldehydes, preferably formaldehyde, and secondary amines, preferably dimethyl amine. (In the context of the invention the term "Mannich bases" also covers condensation products produced with aldehydes other than formaldehyde, especially benzaldehyde). Mono- or poly- nuclear Mannich bases with at least one dialkylamine benzyl group in the molecule, in addition to phenolically-bonded hydroxyl groups, are obtained by suitably selecting the molar ratios between the starting components. To produce the Mannich bases preferably used in accordance with the invention, from 1 to 3 mols of aldehyde and from 1 to 3 mols of secondary amine are generally used per mol of phenol.

Phenols suitable for use in the production of the Mannich bases in accordance with the invention include mono- or poly- hydric phenols with at least one CH-bond condensable with respect to formaldehyde in the o- and p- position to the phenolic hydroxyl groups. Examples of these phenols include phenol itself, cresols, xylenols, dihydroxylbenzenes, nonyl phenols, nonyl cresols, tert.-butyl phenols, isododecyl phenols, ethyl phenols, and the like. The phenols used may also be substituted by such substituents as chlorine or bromine. Instead of these mononuclear phenols it is also possible to use polynuclear phenols, such as 4,4'-dihydroxy diphenyl methane, tetrachloro- and tetrabromo-4,4'-dihydroxy diphenyl methane, 4,4'-dihydroxy diphenyl or 2,4'-dihydroxy diphenyl methane. Formaldehyde in the form of an aqueous formalin solution or in the form of paraformaldehyde or trioxane, is preferably used as the aldehyde. Mannich bases produced with other aldehydes, for example, butyraldehyde or benzaldehyde, are also suitable for use herein. Dimethyl amine represents a preferred secondary amine. However, other secondary aliphatic amines with $C_1$–$C_{18}$ alkyl radicals, such as N-methyl butyl amine, cycloaliphatic secondary amines of the formula $NH(R_1)R_2$ (wherein $R_1$ represents $C_1$–$C_4$ alkyl and $R_2$ represents $C_5$–$C_7$ cycloalkyl), such as N-methylcyclohexyl amine, or even heterocyclic secondary amines, for example, piperidine, pyrrolidine or morpholine, are also suitable for use in the production of the Mannich based herein.

The Mannich bases used as catalysts in the instant invention are produced by known methods, for example, by adding formaldehyde to the mixture of phenolic components and the dimethyl amine at temperature in the range of from 50° to 100° C. At least one mol of formaldehyde has to be used per mol of secondary amine in order to obtain as complete a reaction of these amine components as possible. The simultaneous formation of a polyaromatic system naturally presupposes the use of an additional quantity of aldehyde beyond that corresponding to the amine.

Particulars of the production of the Mannich bases used in the invention are known. Specific examples of their production may be found in the Examples.

The carbamic acid esters used as the second catalyst component herein are reaction products of organic isocyanates with secondary alcohols, more especially isopropanol, secbutanol or mono- or poly-functional polypropylene glycol ethers containing hydroxyl groups. The isocyanate component preferably used for these carbamic acid esters is the same polyisocyanate used as starting isocyanate in the process according to the invention. In other words, the carbamic acid ester cocatalysts are preferably prepared in situ by adding an alcohol containing one or more secondary hydroxyl groups to the polyisocyanate to be polymerized in accordance with the invention. The alcohols are used in a quantity corresponding to an NCO:OH molar ratio of from 4:1 to 15:1, preferably from 6:1 to 10:1. Thus if e.g. the co-catalyst is formed using an NCO:OH ratio of 4:1 75% of the NCO-groups remain behind and the polyisocyanate corresponding to these 75% of NCO-groups represents the "starting polyisocyanate" for the process of the invention. The carbamic acid esters used as co-catalysts may, of course, also be prepared in a separate operation from the alcohol components and organic polyisocyanates which do not have to be identical with the starting polyisocyanate. It does not matter to the polymerization process whether a preformed and isolated carbamic acid ester is added to the isocyanate or isocyanate mixture to be polymerized, or whether the carbamic acid ester is formed beforehand by adding the alcohol components to the isocyanate to the polymerized.

The secondary alcohols containing at least one hydroxyl group which are suitable for the purposes of the invention are simple secondary alcohols or are obtained by the addition of propylene oxide to mono- or poly-functional hydroxyl compounds or to water by known methods using basic or acidic catalysts. The reaction products containing ether groups contain at least two propylene oxide units and secondary and, optionally, primary hydroxyl groups and have molecular weights of up to 1000, but preferably up to 600. In cases where primary hydroxyl groups are simultaneously present, the above-mentioned NCO:OH ratio applies to them as well. Polyols containing less than 60% of secondary hydroxyl groups, based on the total quantity of hydroxyl group, are less suitable. Hydroxyl compounds suitable for the addition of propylene oxide include, water, aliphatic alcohols correponding to the general formula $C_nH_{2n+1}$-OH, (n = 1 – 18), such as methyl alcohols, ethyl alcohol, butanol, 1-decanol, 1-octadecanol, 9-octadecen-1-ol, isopropyl alcohol, 1-chloro-2-propanol, sec-butyl alcohol, 2-ethyl-O-hexanol, diethylene glycol monoalkyl ether, cyclohexanol, benzyl alcohol and substitution products thereof. It is also possible to use polyhydroxy compounds, such as ethylene glycol; 1,2- or 1,3-propylene glycol; butane diols; 2,2-dimethyl-1,3-propane diol; 1,6- or 2,5-hexane diol; 1, 12-octadecane diol; unsaturated hydroxy compounds, such as 2-butene-1,4-diol, and 2-butine-1,4-diol; diethylene glycol; triethylene glycol; glycerol; 1,1,1-trimethylol ethane; 1,1,1-trimethylol propane, pentaerythritol, and sorbitol. Compounds containing aromaticallybonded hydroxyl groups are also suitable. Examples of such compounds include: phenols, cresols, xylenols, dihydroxy benzenes, 4,4'-dihydroxy diphenyl methane, tetrachloro- and tetrabromo-4,4'-dihydroxyl diphenyl methane and 4,4'-dihydroxy diphenyl. The nature of the starter molecule used for the propoxylation reaction is of secondary significance to the use of the carbamic acid esters themselves produced from the polyethers as co-catalysts.

To carry out the process according to the invention, all that is necessary is to add a secondary alcohol of the type defined above, or a mono-substituted carbamic acid ester produced therefrom in a separate operation, and a Mannich base to the isocyanate to be polymerized. To produce the effect according to the invention, three factors must be coordinated with one another for each isocyanate or for each combination of isocyanates to be polymerized. These factors are (1) the type and quantity of mono- and/or polyfunctional secondary alcohol used. (The effectiveness of this component acting as co-catalyst is generally critically determined by the concentration of the mono-substituted carbamic acid esters formed or present); (2) the quantity and type of Mannich based used; and (3) temperature. It is not possible to lay down any hard and fast rules regarding the concentration of the co-catalyst system, because polymerization is also strongly influenced by the hydrolyzable chlorine content, in particular the latent HCl content of the isocyanate to be polymerized in the form of mono-substituted carbamic acid chlorides. Nevertheless, an approximate guideline is that, where polymerization is carried out at a temperature of 100° C with an NCO:OH ratio in the polymerization mixture of from 4:1 to 15:1, preferably from 6:1 to 10:1, Mannich bases should be used in a concentration of from 50 to 3,000 ppm, based on the starting polyisocyanate. In any event, the concentration of the Mannich bases under predetermined polymerization conditions with regard to temperature, quality of the isocyanate and concentration of the co-catalyst, should be selected in such a way that the polymerization reactions automatically come to a standstill at temperatures, in particular, above 100° C without any need for polymerization inhibitors to be added. Accordingly, the end of the polymerization reaction, which is critical to the composition of the soluble polyisocyanate of isocyanurate structure, is determined by the quantity in which the Mannich base is used. If it is desired to obtain a relatively high degree of polymerization, the polymerization reaction may be continued by the addition of more catalyst up to a definite end point. At relatively high temperatures, for example, in the range of from 130° to 150° C, lower degrees of polymerization are reached with the same quantities of catalyst, the polymerization reaction coming to an immediate standstill. Premature termination of a polymerization reaction carried out at low temperatures, for example, 70° C, may also be obtained by increasing the polymerization temperature into the above-mentioned range, so that the reactions, which are always exothermic, do not become uncontrollable. This is of considerable commercial and hence economic significance.

The fact that the degree of polymerization of the reaction mixture for a given concentration of catalyst may be adjusted simply by suitably selecting the reaction temperature, is extremely surprising. Polymerization may only be successfully carried out with the catalyst combination of the invention by controlling the reaction temperature. For example, parallel tests conducted with diethylene glycol or triethylene glycol and a Mannich base suitable for use in accordance with the invention, or with tertiary amines and a polypropylene glycol ether showed that the polymerization reaction could not be controlled simply by selecting the reaction temperature accordingly (cf. also Example 10). The catalyst mixture used is deactivated during the reaction simply by heating the reaction mixture to from 90° to 150° C and and preferably to from 100° to 130° C with heat supplied from outide and/or with the heat generated during the reaction. In one particularly preferred embodiment of the process according to the invention, the combination of starting polyisocyanate and secondary alcohol is heated to the deactivation temperature and the second catalyst component, namely, the Mannich base, is added to the reaction mixture at that temperature.

The main advantage of the process of the invention is the fact that, even when polymerization is carried out on a large scale, it is possible to prevent the reaction from becoming uncontrollable to the extent where it can no longer be brought under control by external cooling, because, if excessive heat is generated, the exothermic reaction automatically results in deactivation of the catalyst and, hence, in termination of the reaction. Accordingly, it is readily possible to terminate the polymerization reaction at an isocyanate content of the reaction mixture which corresponds to from 50 to 90% of the isocyanate content of the polyisocyanate used at the beginning of the reaction.

The exceptional nature of the co-catalyst system of the invention is illustrated in the following Examples. Its exceptional nature is also demonstrated by comparison tests conducted with conventional tertiary amines according to German Patent No. 1,013,869 and also with hydroxyl compounds other than those important to the invention as carbamic acid ester formers.

EXAMPLE 1

Preparation of a Mannich base suitable for use in the invention:

720 parts by weight of a 25% aqueous dimethyl amine solution are added to 188 parts by weight of phenol, followed by the introduction over a period of 30 minutes of 425 parts by weight of a 40% formalin solution. The reaction mixture is then heated for one hour to about 30° C and then for another 2 hours to 80° C. After 2 hours at 80° C, the organic phase is separated off from the aqueous solution by the addition of sodium chloride and the organic phase is concentrated at from 80° to 90° C/10 – 20 Torr. A condensation product with a viscosity of approximately 500 cP$_{25}$ with a nitrogen content of 13.5% is obtained in a yield of approximately 390 parts by weight. The Mannich base is essentially characterized by the following formula:

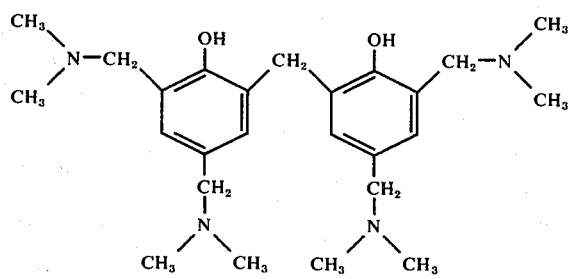

EXAMPLe 2

Preparation of a Mannich base suitable for use in the invention:

220 parts by weight of p-isononyl phenol and 45 parts by weight of dimethyl amine, in the form of a 25% aqueous solution, are initially introduced at about 25° C, following by the introduction over a period of 30 minutes of 30 parts by weight of formaldehyde in the form of a 40% aqueous solution. After a reaction time of 1 hour at 30° C, the temperature is increased over a period of 2 hours to 80° C and left at that level for another 2 hours. The organic phase is then separated from the aqueous phase by the addition of sodium chloride, and the organic phase is concentrated at 70° C/12 Torr. After concentration, any inorganic fractions precipitated are separated off by filtration. A Mannich base with a viscosity of 218 cP at 25° C is obtained in a yield of 264 parts by weight. The Mannich base is essentially characterized by the following formula:

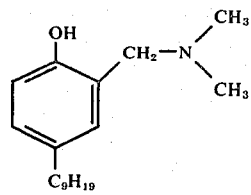

EXAMPLE 3

92 parts by weight of bis-(2-hydroxy-1-propyl)ether are added over a period of 10 minutes at from 80 to 90° C to 1000 parts by weight of tolylene diisocyanate (80% 2,4-, 20% 2,6- isomer). After a reaction time of approximately 1 hour at from 90° to 100° C, a reaction product is obtained with a NCO-value of 38.7% and a refractive index $n_D^{20°}$ of 1.5570 (the course of the polymerization reaction may readily be followed by observing the refractive indexes).

0.4 parts by weight of the co-catalyst described in Example 1 are added to batches of 300 parts by weight of the adduct prepared above in this example (a) at 70° C; (b) at 130° C; and (c) at 150° C. The polymerization reactions begin immediately and, in case (a), result after 30 minutes (during which time trimerization progresses steadily without any recognizable deceleration in the reaction velocity) in the formation of a highly viscous reaction product with a refractive index $n_D^{20°}$ of 1.5910. In case (b), the reaction begins quickly and almost immediately slows down, resulting after 70 minutes in the formation of a reaction product with an NCO-content of 33% and a refractive index $n_D^{20°}$ of 1.5720, and after 5 hours at 130° C in the formation of a reaction product with an NCO-content of 31.3% and a refractive index $n_D^{20°}$ of 1.5762. In case (c), the reaction slows down much more distinctly, ultimately coming to a standstill. A reaction product with a refractive index $n_D^{20°}$ of 1.5690 and a higher NCO-content by comparison with test (b) is obtained after 5 hours.

If pure tolylene-2,4-diisocyanate is used and polymerization carried out at 150° C, a reaction product with an NCO-content of 31.5 % and the refractive index $n_D^{20°}$ of 1.5770 is obtained after 5 hours during which the reaction follows a course similar to case (b). In all the tests described here, the reaction temperature rose by from 10° to 40° C from the initial temperature indicated. In Example (a), this increase in temperature was obviously not sufficient to reach the deactivation temperature of the catalyst system.

EXAMPLE 4

402 parts by weight of a bifunctional polypropylene glycol ether (hydroxy number 192) obtained from 1,2-propylene glycol and propylene oxide, are added over a period of 10 minutes from about 80° to 90° C to 1000 parts by weight of tolylene diisocyanate (80% 2,4-, 20% 2,6- isomer). A reaction product with an NCO-content of 30.3% and a refractive index $n_D^{20°}$ of 1.5285, is obtained after a total reaction time of 1 hour at from 90° to 100° C.

When 0.4 part by weight of the Mannich base obtained in accordance with Example 1 is added at 130° C to 300 parts by weight of this reaction product, the polymerization reaction slows down almost to a standstill soon after a quick start. An NCO-content of 22.1% is measured after 30 minutes, falling to 21.0% after 5 hours. The refractive indexes $n_D^{20°}$ corresponding to these values are 1.5448 and 1.5470, respectively.

The reaction follows a similar course at 150° C, a refractive index $n_D^{20°}$ of 1.5420 being measured after 5 hours. By contrast, there is no decrease in the velocity of the reaction at 70° C, a refractive index $n_D^{20°}$ of 1.5540 being measured after 30 minutes. In all the tests described here, the initial temperature indicated by from 40° to 80° C during the reaction. A starting temperature of 70° C is clearly not sufficient to reach the deactivation temperature of the catalyst system.

In the interests of clarity, the results of this Example are graphically illustrated in the Table. In this Table three curves are shown which illustrate the reaction at different starting temperatures at set forth hereinbefore. At starting temperatures of 130° C resp. 150° C the reaction comes to a standstill (the refractive index does no longer change) whereas at the starting temperature of 70° C the reaction does not come to a standstill (the refractive index is continuously increasing).

EXAMPLE 5

142.4 parts by weight of an addition product of trimethylol propane and propylene oxide (hydroxyl number 541) are added over a period of 10 minutes at from 80° to 90° C to 1000 parts by weight of tolylene diisocyanate (80% 2,4-, 20% 2,6- isomer).

A reaction product with an NCO-content of 36.8% and a refractive index $n_D^{20°}$ of 1.5538 is obtained after a reaction time of about 1 hour at from 90° to 100° C.

0.4 part by weight of the Mannich base obtained in accordance with Example 1 is added at 130° C to 300 parts by weight of this adduct. After 1 hour, the moderately exothermic polymerization reaction which begins immediately results in the formation of a product with an NCO-content of 31.9% and a refractive index $n_D^{20°}$ of 1.5649. After another 4 hours at 130° C, the product obtained has an NCO-content of 30.8% for a refractive index $n_D^{20°}$ of 1.5680.

If by contrast, polymerization is carried out at 70° C under otherwise the same test conditions, a steadily progressing polymerization reaction is observed, resulting in the formation after 25 minutes of a highly viscous reaction product with a refractive index $n_D^{20°}$ of 1.5850. In all the tests described here, the initial temperature indicated rose by from 40° to 80° C during the reaction. An initial temperature of 70° C is clearly not sufficient to reach the deactivation temperature of the catalyst system.

EXAMPLE 6

207 parts by weight of an addition product of trimethylol propane and propylene oxide (hydroxyl number 372) are added over a period of 10 minutes at from 80° to 90° C to 1000 parts by weight of tolylene diisocyanate (80% 2,4-, 20% 2,6-isomer). A reaction product with an NCO-content of 35.0% (theoretical value 35.2%) and a refractive index $n_D^{20°}$ of 1.5462, is obtained after a reaction time of about 1 hour at from 90° to 100° C. 0.4 part by weight of the Mannich base obtained in accordance with Example 1 is added at 130° C to 300 parts by weight of this adduct. The moderately exothermic polymerization reaction, which begins immediately without any incubation period, soon becomes more moderate, the reaction product being characterized after 1 hour by an NCO-content of 28.5% and, after another 5 hours at 130° C, by an NCO-content of 27.0% for a refractive index $n_D^{20°}$ of 1.5652.

If polymerization is carried out at 70° C under otherwise the same conditions, a steadily progressing polymerization reaction is observed, resulting in the formation after 20 minutes of a highly viscous reaction product with a refractive index $n_D^{20°}$ of 1.5730. In all the tests described here, the initial temperature indicated rose by from 40° to 75° C during the reaction. An initial temperature of 70° C is obviously not sufficient to reach the deactivation temperature of the catalyst system.

EXAMPLE 7

70 parts of dipropylene glycol, containing the isomers 2-hydroxy-1-propyl-(1-hydroxy-2-propyl)-ether, bis-(2-hydroxy-1-propyl)-ether and bis-(1-hydroxy-2-propyl)-ether in quantities of 50%, 40% and 10%, respectively, are added over a period of 10 minutes at 80° C to a mixture of 500 parts of tolylene-2,4-diisocyanate and 500 parts of 4,4'-diphenyl methane diisocyanate, followed by reaction for 1 hour at from 90 to 100° C. After the reaction, the 40.9% NCO-content of the starting mixture amounts to 34.0% against a theoretical NCO-content of 34.1%. The NCO:OH ratio amounts to 9.33.

a. 0.2 parts by weight of the Mannich base obtained in accordance with Example 1 is added at 130° C to 300 parts by weight of the NCO-adduct with an NCO-content of 34.0% and a refractive index $n_D^{20°}$ of 1.5720. The polymerization reaction which begins immediately without any incubation time and during which the temperature rises to 150° C, comes virtually to a standstill after only about 20 minutes at a refractive index $n_D^{20°}$ of 1.5830. After a total reaction time of 6 hours at 150° C, the reaction product is characterized by an NCO-content of 29.5% for a refractive index $n_D^{20°}$ of 1.8545.

b. If polymerization is carried out with the same quantities of components at a constant temperature of 50° C, it does not come to a standstill. A highly viscous reaction mixture with a refractive index $n_D^{20°}$ of 1.5972 is obtained after 35 minutes.

EXAMPLE 8

100 parts by weight of tripropylene glycol are added over a period of 10 minutes at 80° C to a mixture of 500 parts by weight of tolylene diisocyanate (80% 2,4-, 20% 2,6- isomer) and 500 parts by weight of 4,4'-diphenyl methane diisocyanate, followed by reaction for 1 hour at from 90° to 100° C. A reaction product with an NCO-content of 32.7% and a refractive index $n_D^{20°}$ of 1.5694 is obtained.

0.4 part by weight of the Mannich base obtained in accordance with Example 1 is added to 130° C to 300 parts by weight of this NCO adduct. The moderately exothermic polymerization reaction which begins immediately without any incubation period results after 30 minutes in the formation of a reaction product with an NCO-content of 26.8%, and after 6 hours in the formation of a reaction product with an NCO-content of 25.5%, which indicates that the polymerization reaction has come virtually to a standstill after a reaction time approximately 0.5 to 1 hour. The refractive indexes $n_D^{20°}$ corresponding to these NCO-contents are 1,5868 and 1,5888, respectively.

If polymerization is carried out with the same quantities of components at 70° C, the reaction does not come to a standstill. A highly viscous reaction mixture with a refractive index $n_D^{20°}$ of 1.5944 is obtained after 40 minutes.

EXAMPLe 9

132 parts by weight of tripropylene glycol are added over a period of 10 minutes at 70° to 80° C to 1000 parts by weight of 4,4'-diphenyl methanol diisocyanate. A reaction product with an NCO-value of 24.5% (theoretical value 24.6%) is obtained after a total reaction time of approximately 1 hour at from 90° to 100° C.

a. If 0.4 part by weight of the Mannich base obtained in accordance with Example 1 is added at 130° C to 300 parts by weight of the adduct, the polymerization reaction, having started immediately, soon undergoes a reduction in velocity, resulting in the formation after 3 hours of a reaction product with an NCO-content of 21.8% and a refractive index $n_D^{20°}$ of 1.5920. By contrast, the polymerization reaction takes place quickly at a reaction temperature of 70° C without any apparent reduction in velocity.

b. If the Mannich base according to Example 1 is replaced by an amine-equivalent quantity of hexahydrodimethyl aniline under otherwise the same testing conditions, the polymerization reactions carried out at 70° C and 130° C result in the formation in both bases, of highly viscous reaction products of isocyanurate structure without any apparent reductions in reaction velocity.

EXAMPLE 10

132 parts of weight of tripropylene glycol are added over a period of 10 minutes at 80° C to 1000 parts by weight of tolylene diisocyanate (80% 2,4-, % 2,6- isomer). A reaction product with an NCO-content of 37.4% and a refractive index $n_D^{20°}$ of 1.5530 is obtained after a reaction time of approximately 1 hour at from 90° to 100° C.

a. 0.4 part by weight of the Mannich base obtained in accordance with Example 1 is added at 130° C to 300 parts by weight of this adduct. The polymerization reaction which begins immediately comes virtually to a standstill after a reaction time of 1 hour. The reaction product formed has an NCO-content of 33.0% for a refractive index $n_D^{20°}$ of 1.5640. If polymerization is carried out at a temperature of 70° C, it does not undergo any apparent reduction in velocity, a highly viscous reaction product with a refractive index $n_D^{20}$ of 1.5832 being obtained after 30 minutes with the reaction still in progress.

b. If, for comparison with the Mannich base, polymerization is carried out with amine-equivalent quantities of hexahydrodimethyl aniline or permethylated diethylene triamine at temperature of 70° C and 130° C, high reaction velocities are maintained in both cases in complete contrast to the polymerization reactions carried out with Mannich bases at 130° C.

If the 132 parts by wieght of tripropylene glycol used in this Example are replaced by OH-equivalent quantities of triethylene or diethylene glycol, namely, 103.1 parts by weight and 72.9 parts by weight the reaction products formed have NCO-contents of 38.5% respectively.

If these adducts are polymerized with the above-mentioned Mannich base at 130° C or 150° C, the reactions are highly exothermic, resulting after a short time in the formation of highly viscous reaction products. In the case of triethylene glycol, a solid end product is actually obtained after 2 minutes at 130° C, indicating that polymerization has taken place uncontrollably.

EXAMPLE 11

If 0.15 part by weight of the Mannich base according to Example 1 are added at 70° C to 300 parts by weight of the adduct with an NCO-content of 37.4% obtained from tripropylene glycol and tolylene diisocyanate in accordance with Example 10, polymerization takes place quickly over a period of 20 minutes, resulting in the formation of a reaction product with a refractive index $n_D^{20°}$ of 1.5646. If the reaction temperature is then increased over a period of 12 minutes to 150° C, the reaction velocity is increasingly reduced during this increase in temperature, the reaction ultimately coming to a standstill at 150° C ($n_D^{20°}$ : 1.5691).

EXAMPLE 12

0.4 part by weight of the Mannich base obtained in accordance with Example 2 is added at 130° C to 300 parts by weight of the adduct with an NCO-content of 37.4% obtained from tripropylene glycol and tolylene diisocyanate in accordance with Example 10. After a fast beginning to the reaction, an NCO-content of 31.7% is measured after 1 hour and an NCO-content of 30.9% after 6 hours. Accordingly, the reaction has come virtually to a standstill after a reaction time of 1 hour.

If 0.2 part by weight of Mannich base is used under otherwise the same test conditions, a reaction product with and NCO-content of 34.0% is obtained after 6 hours, the reaction having followed a similar course.

EXAMPLE 13

100 ppm of the Mannich base of Example 1 are added at 130° to 500 parts by weight of the adduct of Example 10. The polymerization reaction which begins immediately comes virtually to a standstill after a reaction time of 90 minutes. Another 100 ppm of the above-mentioned Mannich base are then added to the reaction mixture. The polymerization reaction continues immediately and comes virtually to a standstill after a reaction time of 3.5 hours (refractive index $n_D^{50}$ : 1.5592). Another 50 ppm of the Mannich base are added to the reaction mixture. The polymerization reaction comes to a standstill again after approximately 90 minutes. Another 50 ppm of Mannich base were then added to the mixture. Polymerization begins again and comes to a virtual standstill after a reaction time of 4 hours (refractive index $n_D^{50}$ : 1.5672).

EXAMPLE 14

1340 ppm of the Mannich base of Example 2 are added at 130° C to 500 parts by weight of the adduct of Example 10.

The polymerization reaction which begins immediately comes to a virtual standstill after a reaction time of 4.5 hours. The reaction product formed has a refractive index $n_D^{5:0}$ of 1.5688 and an NCO-content of 30.5%.

EXAMPLE 15

680 ppm of a Mannich base prepared in accordance with Example 2 from equimolar quantities of benzamide, formaldehyde and dimethyl aniline, are added at 130° C to 500 parts by weight of the adduct of Example 10. The polymerization reaction which begins immediately comes to a virtual standstill after a reaction time of 5.5 hours. The reaction product formed has a refractive index $n_D^{50}$ of 1.5584 and an NCO-value of 34.5%.

EXAMPLE 16

670 ppm of a Mannich base prepared in accordance with Example 2 from equimolar quantities of 2,4- dimethyl phenol, benzaldehyde and dimethyl amine, are added at 130° C to 500 parts by weight of the adduct of Example 10. The polymerization reaction which begins immediately comes to a virtual standstill after a reaction time of 5 hours. The reaction product formed has a refractive index $n_D^{50}$ of 1.5591 and an NCO-content of 34.2%.

EXAMPLE 17

650 ppm of a Mannich base prepared in accordance with Example 2 from equimolar quantities of indole, formaldehyde and dimethyl amine, are added at 130° C to 500 parts by weight of the adduct of Example 10. The polymerization reaction which begins immediately comes to a virtual standstill after a reaction time of 5 hours. The reaction product formed has a refractive index $n_D^{50}$ of 1.5708 and an NCO-content of 34.1%.

EXAMPLE 18

1340 ppm of a Mannich base prepared in accordance with Example 2 from equimolar quantities of indole, benzaldehyde and piperidine are added at 130° C to 500 parts by weight of the adduct of Example 10. The polymerization reaction which begins immediately comes to a virtual standstill after a reaction time of 3.5 hours. The reaction product formed has a refractive index $n_D^{50}$ of 1.5620 and an NCO-content of 33.5%.

EXAMPLE 19

47.7 parts by weight of isopropanol are added over a period of 10 minutes at approximately 80° C to 500 parts by weight of tolylene diisocyanate (80% 2,4-, 20% 2,6- isomer). A reaction product with an NCO-content of 39.0% is obtained after a reaction time of about 1 hour at 80° C.

300 ppm of the Mannich base of Example 1 are added at 100° C into 500 parts by weight of this adduct. The polymerization reaction which begins immediately comes to a virtual standstill after a reaction time of 6 hours. The reaction product formed has a refractive index $n_D^{50}$ of 1.5554 and an NCO-content of 35.5%.

What is claimed is:

1. A process for the production of organic polyisocyanates of isocyanurate structure comprising polymerizing organic polyisocyanates in the presence of catalysts which accelerate the trimerization of isocyanate groups to form isocyanurates, said catalyst comprising a mixture of Mannich bases and carbamic acid esters of isocyanates and alcohols with secondary hydroxyl groups.

2. The process of claim 1 comprising the further step of thermally deactivating the catalyst by heating the reaction mixture to a temperature of from about 90° C to about 150° C to thereby terminate the polymerization reaction.

3. The process of claim 2 wherein the deactivation of the catalyst occurs at an NCo content of the polyisocyanate mixture formed which corresponds to between 505 and 90% of the isocyanate content of the polyisocyanate mixture used at the beginning of the polymerization reaction.

4. The process of claim 1 wherein the carbamic acid esters used as co-catalysts are prepared in situ from isocyanates and secondary alcohols by adding a secondary alcohol to the polyisocyanate to be polymerized.

5. The process of claim 4 wherein the NCO:OH molar ratio is between 4:1 and 15:1.

6. The process of claim 4 wherein the NCO:OH molar ratio is between 6:1 and 10:1.

7. The process of claim 1 wherein the starting polyisocyanate and the carbamic acid ester basedon isocyanates and secondary alcohols is heated to from 100° to 130° C and the Mannich base is added to the reaction mixture at that temperature.

8. The process of claim 1 wherein the Mannich bases are used in quantities of from 50 to 3000 ppm based on the reaction mixture as a whole.

9. The process of claim 1 wherein the Mannich bases are used in quantities of from 200 to 2000 ppm based on the reaction mixture as a whole.

10. The process of claim 1 wherein the Mannich bases used are prepared from phenol, formaldehyde and dimethyl amine.

11. The process of claim 1 wherein the starting polyisocyanate used is selected from the group consisting of 2,4-, 2,6-tolylene diisocyanate and a polyisocyanate of the diphenyl methane series.

* * * * *